US008748507B2

(12) United States Patent
Yada et al.

(10) Patent No.: US 8,748,507 B2
(45) Date of Patent: Jun. 10, 2014

(54) ACTIVE ENERGY RAY CURABLE RESIN COMPOSITION

(75) Inventors: Minoru Yada, Yamaguchi (JP); Yuuki Kokufu, Yamaguchi (JP); Yuu Takata, Yamaguchi (JP); Hideo Hosaka, Yamaguchi (JP); Kenichi Fujino, Yamaguchi (JP)

(73) Assignee: Nippon Paper Chemicals Co., Ltd., Tokyo (JP)

( * ) Notice: Subject to any disclaimer, the term of this patent is extended or adjusted under 35 U.S.C. 154(b) by 171 days.

(21) Appl. No.: 13/145,373

(22) PCT Filed: Jan. 21, 2010

(86) PCT No.: PCT/JP2010/050712
§ 371 (c)(1),
(2), (4) Date: Jul. 20, 2011

(87) PCT Pub. No.: WO2010/084913
PCT Pub. Date: Jul. 29, 2010

(65) Prior Publication Data
US 2011/0274941 A1    Nov. 10, 2011

(30) Foreign Application Priority Data
Jan. 22, 2009  (JP) .................................. 2009-011483

(51) Int. Cl.
*C08J 3/28*      (2006.01)
*C08G 61/04*   (2006.01)

(52) U.S. Cl.
USPC ............... 522/150; 522/1; 522/161; 522/157; 520/1

(58) Field of Classification Search
USPC ........................... 522/150, 1, 161, 157; 520/1
See application file for complete search history.

(56) References Cited

U.S. PATENT DOCUMENTS

| | | | |
|---|---|---|---|
| 6,927,242 B2 * | 8/2005 | Asami et al. .................... | 522/79 |
| 2004/0034153 A1 | 2/2004 | Nishida et al. | |
| 2005/0065228 A1 | 3/2005 | Nishida et al. | |
| 2005/0239930 A1 | 10/2005 | Clair et al. | |
| 2007/0093571 A1 | 4/2007 | Tamai et al. | |
| 2010/0006217 A1 * | 1/2010 | Slark et al. ................. | 156/273.3 |

FOREIGN PATENT DOCUMENTS

| | | | |
|---|---|---|---|
| EP | 1980597 A1 | | 10/2008 |
| JP | 8-41435 | | 2/1996 |
| JP | 9 222730 | | 8/1997 |
| JP | 09-222730 | * | 8/1997 |
| JP | 11 209558 | | 8/1999 |
| JP | 2002 60407 | | 2/2002 |
| JP | 2003 64111 | | 3/2003 |
| JP | 2003 238885 | | 8/2003 |
| JP | 2003-238885 | * | 8/2003 |
| JP | 2005 139305 | | 6/2005 |
| JP | 2005 302564 | | 10/2005 |
| JP | 2005-302564 | * | 10/2005 |
| JP | 2006 528268 | | 12/2006 |
| WO | WO93/20164 A1 | | 10/1993 |
| WO | WO00/41036 A1 | | 7/2000 |
| WO | 02 44299 | | 6/2002 |
| WO | WO2009/075971 A2 | | 6/2009 |
| WO | WO2010/071952 A1 | | 7/2010 |

OTHER PUBLICATIONS

International Search Report issued May 18, 2010 in PCT/JP10/50712 filed Jan. 21, 2010.
European Search Report issued Feb. 26, 2014, in European Application No. 10733520.0, filed Jan. 21, 2010.

* cited by examiner

Primary Examiner — Ling Choi
Assistant Examiner — Jessica E Whiteley
(74) Attorney, Agent, or Firm — Oblon, Spivak, McClelland, Maier & Neustadt, L.L.P.

(57) ABSTRACT

It is an object of the present invention to provide an active energy ray curable resin composition exhibiting good adhesion to a polyolefin-based resin base material. More specifically, there is provided an active energy ray curable resin composition comprising: a block copolymer (C) that includes a polymer block (A) composed mainly of an olefin-based monomer unit and a polymer block (B) composed of a vinyl-based monomer unit having a carboxyl group, a carboxylic anhydride group, or a sulfonic acid group and/or a second vinyl-based monomer unit copolymerizable with the aforementioned vinyl-based monomer unit, the block copolymer (C) having a weight-average molecular weight from 5,000 to 100,000; and an active energy ray curable compound (D).

12 Claims, No Drawings

ACTIVE ENERGY RAY CURABLE RESIN COMPOSITION

TECHNICAL FIELD

The present invention relates to an active energy ray curable resin composition having good adhesion to base materials formed of polyolefin-based resin etc. and to paints, inks, adhesives, sealants, and primers containing the composition as an active component.

BACKGROUND ART

Polyolefin-based resins such as polypropylene and polyethylene are inexpensive and have various good properties such as good moldability, chemical resistance, water resistance, and electrical characteristics. Therefore, in recent years, such polyolefin-based resins are widely used for sheets, films, molded products, and the like. However, unlike polar base materials containing polyurethane-based resins, polyamide resins, acrylic-based resins, polyester resins, and the like, base materials containing the polyolefin-based resins are nonpolar and crystalline (hereinafter, these base materials containing the polyolefin-based resins may be referred to as "polyolefin base materials"). Therefore, these polyolefin base materials have a drawback in that application of polar paints thereto and their adhesion (bonding) to polar materials are difficult, i.e., a drawback in that their adhesion (bonding) properties are low.

A method to overcome this problem is that the surface of a polyolefin base material is activated by plasma or gas flame treatment to improve adhesion properties. However, this method has a problem in that its complicated process requires large equipment cost and involves time loss. A further drawback is that the effects of the surface treatment could be non-uniform when the shape of the base material is complexity or due to the influence of a pigment or an additive in the resin.

Another method is that a chlorinated polyolefin resin is used as a coating composition to improve the affinity of a polyolefin base material for a polar paint or a polar material so that the adhesion properties are improved. However, this method has a stability problem due to dehydrochlorination. In addition, because of recent increasing environmental awareness, there is a tendency to avoid the use of chlorine, and this is also a problem.

Paints and adhesives (active energy ray curable paints and adhesives) containing compounds (active energy ray curable compounds) that are curable with active energy rays typified by ultraviolet (UV) rays and electron beams (EB) have been developed. These active energy ray curable paints and adhesives have advantages, for example, in that they are solvent free and their environmental load is low, that their curing rate is very high and products can be produced at high productivity, and that they can be used also for thermally unstable materials because a heating process is not necessary. Various techniques for adhesion of active energy ray curable paints and adhesives to polar base materials are known.

Generally, resins capable of allowing paint or ink components to adhere to nonpolar base materials such as polyolefin base materials have low compatibility with active energy ray curable compounds. Therefore, generally, to apply an energy ray curable paint or ink to a polyolefin base material, the base material is undercoated (pre-coated) with a resin capable of allowing the paint or ink component to adhere to the base material, and then the energy ray curable paint or adhesive is applied.

In view of the above circumstances, a technology for improving the compatibility of resins capable of allowing paint and ink components to adhere to polyolefin base materials with active energy ray curable compounds is being developed. Known examples of such technology include: a composition containing a chlorinated polyolefin resin and a photo-curable compound (JP 2005-139305 A: Patent document 1); and an ultraviolet ray curable coating composition containing a predetermined amount of unsaturated carboxylic acid and/or a derivative thereof and also containing a modified polyolefin resin having a weight-average molecular weight within a predetermined range (JP 2003-238885 A: Patent document 2). However, in the technology in Patent document 1, occurrence of dehydrochlorination due to irradiation with ultraviolet rays and a reduction in temporal stability of adhesion caused by the dehydrochlorination are concerned. The technology in Patent document 2 embraces a problem that environmental load is high because substantially a large amount of a dilution solvent must be used.

Therefore, there has been a demand for a composition comprising an active energy ray curable compound and a chlorine-free resin, wherein the compound and the resin are uniformly dissolved or mixed in the composition without the presence of any solvent, and the composition exhibits good solution properties such as maintaining fluidity or a highly viscous state; and also the cured product of the composition provides a cured film firmly adhering to a polyolefin base material. However, such a composition has not been developed.

RELATED ART DOCUMENTS

Patent Documents

Patent document 1: JP 2005-139305 A
Patent document 2: JP 2003-238885 A

SUMMARY OF THE INVENTION

Problem to be Solved by the Invention

Accordingly, it is an object of the present invention to provide an active energy ray curable resin composition that contains no resin containing chlorine, exhibits good adhesion to polyolefin base materials, and has good solution properties even when the composition is used for paints, inks, adhesives, sealants, or primers containing no solvent.

Means for Solving Problem

As a result of intensive studies for achieving the object of the invention, the present inventors have found that a particular block copolymer has good compatibility with an active energy ray curable compound and that a composition containing the block copolymer and the compound exhibits good solution properties. The inventors have also found that the above particular block copolymer intrinsically exhibits good adhesion to polyolefin base materials and this adhesion property is also exerted in the composition containing the resin and the active energy ray curable compound.

The present invention provides following [1] to [7].
[1] An active energy ray curable resin composition, comprising:
a block copolymer (C) that includes a polymer block (A) composed mainly of an olefin-based monomer unit and a polymer block (B) composed of a vinyl-based monomer unit having a carboxyl group, a carboxylic anhydride group, or a sulfonic acid group and/or a second vinyl-based monomer unit copolymerizable with the aforementioned vinyl-based monomer unit, the block copolymer (C) having a weight-average molecular weight of 5,000 or more and 100,000 or less; and an active energy ray curable compound (D).

[2] The active energy ray curable resin composition according to [1], wherein the polymer block (B) is a polymer including (meth)acrylic ester and a vinyl-based monomer unit having a carboxyl group.

[3] The active energy ray curable resin composition according to [1], wherein the polymer block (B) is a polymer including (meth)acrylic acid and (meth)acrylic ester.

[4] The active energy ray curable resin composition according to any one of [1] to [3], wherein an amount of the block copolymer (C) is 0.1 wt % or more and 40 wt % or less.

[5] The active energy ray curable resin composition according to any one of [1] to [4], further comprising a photopolymerization initiator (E).

[6] A paint, ink, adhesive, sealant, or primer for a base material or molded product containing a polyolefin-based resin, comprising the active energy ray curable resin composition according to any one of [1] to [5].

[7] A molded product containing a polyolefin-based resin, the molded product comprising a coating layer formed by curing the active energy ray curable resin composition according to any one of [1] to [5].

Effects of the Invention

The present invention provides an active energy ray curable resin composition which exhibits good adhesion to polyolefin base materials, contains no chlorine, and exhibits good solution properties even without containing any solvent. The block copolymer (C) and the active energy ray curable compound (D) contained in the active energy ray curable resin composition of the present invention can be uniformly dissolved or mixed without any solvent. Therefore, the resin composition of the present invention, together with, for example, a paint component or an ink component, can be applied to a polyolefin base material in one step. The active energy ray curable resin composition of the present invention is curable with active energy rays, and accordingly, the resin composition applied to a base material can form a coating film without any heating process. Therefore, the active energy ray curable resin composition can also be used for a base material composed of a thermally unstable material, and the material for the base material is not limited. Moreover, the active energy ray curable resin composition of the present invention contains neither chlorine nor solvent, leading to low environmental load.

EMBODIMENTS FOR CARRYING OUT THE INVENTION

An active energy ray curable resin composition of the present invention contains a block copolymer (C) and an active energy ray curable compound (D).

The block copolymer (C) in the present invention comprises a polymer block (A) and a polymer block (B) described below. Examples of the block copolymer (C) may include AB-type diblock copolymers, ABA-type triblock copolymers, and BAB-type triblock copolymers. Among them, AB-type diblock copolymers are preferred.

The polymer block (A) is composed mainly of an olefin-based monomer unit. More specifically, the polymer block (A) is composed of a polymer composed mainly of an olefin-based monomer unit. The amount of the olefin-based monomer unit in the polymer block (A) is preferably in the range from 50 mole % to 100 mole %, more preferably in the range from 70 mole % to 100 mole %, and most preferably in the range from 80 mole % to 100 mole %, based on the total number of moles of all the structural units in the polymer block (A).

The olefin-based monomer unit means a unit derived from an olefin-based monomer. Examples of the olefin-based monomer may include: ethylene; α-olefins such as propylene, 1-butene, 2-methyl-1-butene, 3-methyl-1-butene, 1-pentene, 4-methyl-1-pentene, 1-hexene, 1-octene, 1-decene, and 1-octadecene; 2-butene; isobutylene; conjugated dienes such as butadiene, isoprene, and cyclopentadiene; vinylcyclohexane; and β-pinene. The polymer block (A) may include a unit derived from one type of the olefin-based monomers. Alternatively, the polymer block (A) may include units derived from two or more types of the olefin-based monomers.

Preferably, the polymer block (A) includes a unit derived from ethylene or propylene. Particularly, a polymer block composed of a unit derived from propylene; and a copolymer block composed of a unit derived from propylene and a unit derived from an α-olefin other than propylene are more preferable. The amount of propylene in the polymer block (A) is preferably in the range from 70 mole % to 100 mole %, and more preferably in the range from 80 mole % to 100 mole %, based on the total number of moles of all the structural units in the polymer block (A). The α-olefin other than propylene is preferably ethylene or 1-butene.

When the olefin-based monomer unit is a unit derived from a conjugated diene such as butadiene, isoprene and cyclopentadiene, an unsaturated bond present may be hydrogenated.

The polymer constituting the polymer block (A) is composed mainly of the olefin-based monomer unit described above. Therefore, the polymer block (A) may contain, in addition to the olefin-based monomer unit, a unit other than the olefin-based monomer unit. For example, the polymer block (A) may contain a unit derived from a vinyl-based monomer copolymerizable with the olefin-based monomer in the range of 0 to 50 mole % as necessary. The amounts of the olefin-based monomer unit and the unit other than the olefin-based monomer unit in the polymer block (A) are as follows. Preferably, the amount of the olefin-based monomer unit is in the range from 70 mole % to 100 mole %, and the amount of the unit other than the olefin-based monomer is in the range from 0 mole % to 30 mole %. More preferably, the amount of the olefin-based monomer unit is in the range from 80 mole % to 100 mole %, and the amount of the unit other than the olefin-based monomer is in the range from 0 mole % to 20 mole %.

Examples of the vinyl-based monomer copolymerizable with the olefin-based monomer may include: (meth)acrylonitrile; vinyl esters such as vinyl acetate and vinyl pivalate; (meth)acrylic esters such as methyl(meth)acrylate, ethyl (meth)acrylate, butyl (meth)acrylate, dodecyl(meth)acrylate, and 2-ethylhexyl(meth)acrylate; (meth)acrylamide; and N-vinyl-2-pyrrolidone. One type or two or more types of them may be used. Among them, methyl acrylate, ethyl acrylate, and vinyl acetate are preferred.

The polymer constituting the polymer block (A), which is composed mainly of the olefin-based monomer unit, may be a modified polymer. The modification of the polymer may be performed by any known method such as epoxidation, hydroxylation, anhydrous carboxylation, and carboxylation.

The polymer block (A) may be obtained by degradation of a polymer composed mainly of the olefin-based monomer unit described above. In this case, a double bond is introduced at the terminal end of the polymer constituting the polymer block (A), which is composed mainly of the olefin-based monomer unit, and thus the molecular weight of the polymer block (A) can be adjusted. Examples of the method of degradation include: a method in which a polymer composed mainly of the olefin-based monomer unit is thermally decomposed at high temperature (for example, from 400° C. to 500° C.) in an oxygen-free atmosphere; and a method in which a polymer composed mainly of the olefin-based monomer unit is decomposed in an oxygen-free atmosphere in the presence of an organic peroxide. Any of the above methods may be used.

Examples of the organic peroxide may include di-t-butyl peroxide, dicumyl peroxide, t-butyl cumyl peroxide, benzoyl peroxide, dilauryl peroxide, cumene hydroperoxide, t-butyl hydroperoxide, 1,1-bis(t-butyl peroxy)-3,5,5-trimethyl cyclohexane, 1,1-bis(t-butyl peroxy)-cyclohexane, cyclohexanone peroxide, t-butyl peroxy benzoate, t-butyl peroxy isobutyrate, t-butyl peroxy-3,5,5-trimethyl hexanoate, t-butyl peroxy-2-ethyl hexanoate, t-butyl peroxy isopropyl carbonate, cumyl peroxy octoate, and the like.

The polymer block (B) is a polymer block including a vinyl-based monomer unit having a carboxyl group, a carboxylic anhydride group, or a sulfonic acid group and/or a second vinyl-based monomer unit copolymerizable with the aforementioned vinyl-based monomer. More specifically, the polymer block (B) is composed of one or both of: the aforementioned vinyl-based monomer unit having, as a substituent, a carboxy group, a carboxylic anhydride group, or a sulfonic acid group; and the second vinyl-based monomer unit copolymerizable with the aforementioned vinyl-based monomer.

The vinyl-based monomer unit having a carboxyl group, a carboxylic anhydride group, or a sulfonic acid group refers to a unit derived from a vinyl-based monomer having a carboxyl group (which may have a carboxylic anhydride group or a sulfonic acid group), a unit derived from a vinyl-based monomer having a carboxylic anhydride group (which may have a carboxyl group or a sulfonic acid group), or a unit derived from a vinyl-based monomer having a sulfonic acid group (which may have a carboxyl group or a carboxylic anhydride group). The vinyl-based monomer unit having a carboxyl group, a carboxylic anhydride group, or a sulfonic acid group may include one type of unit or two or more types of units selected from the group consisting of a vinyl-based monomer unit having a carboxyl group, a vinyl-based monomer unit having a carboxylic anhydride group, and a vinyl-based monomer unit having a sulfonic acid group. A vinyl-based monomer unit having a carboxyl group is preferred as the vinyl-based monomer unit having a carboxyl group, a carboxylic anhydride group, or a sulfonic acid group.

The amount of the vinyl-based monomer unit having a carboxyl group, a carboxylic anhydride group, or a sulfonic acid group in the polymer block (B) is preferably in the range from 0 mole % to 100 mole %, more preferably in the range from 0 mole % to 50 mole %, and most preferably in the range from 0 mole % to 30 mole %, based on the total number of moles of all the structural units in the polymer block (B).

Examples of the vinyl-based monomer having a carboxyl group may include acrylic acid, methacrylic acid, crotonic acid, cinnamic acid, itaconic acid, maleic acid, and the like, and one or two or more of them may be used. Among them, (meth)acrylic acid (acrylic acid or methacrylic acid) is preferred.

Examples of the vinyl-based monomer having a carboxylic anhydride group (a group represented by the formula: —CO—O—CO—) may include maleic anhydride, itaconic anhydride, citraconic anhydride, butenyl succinic anhydride, tetrahydro phthalic anhydride, and the like, and one or two or more of them may be used.

Examples of the vinyl-based monomer having a sulfonic acid group may include 4-styrenesulfonic acid, 2-methyl-2-propene-1-sulfonic acid, allyl sulfonic acid, 2-acrylamido-2-methylpropane-1-sulfonic acid, and the like, and one or two or more of them may be used. A vinyl monomer in which the sulfonic acid group is in a state of a salt with a metal such as sodium and potassium or an ammonium salt may be used.

"A second vinyl-based monomer unit copolymerizable with a vinyl-based monomer unit having a carboxyl group, a carboxylic anhydride group, or a sulfonic acid group" (hereinafter may be abbreviated as a second vinyl-based monomer unit) refers to a unit derived from "a second vinyl-based monomer copolymerizable with a vinyl-based monomer having a carboxyl group, a carboxylic anhydride group, or a sulfonic acid group" (hereinafter may be abbreviated as a second vinyl-based monomer). Generally, the second vinyl-based monomer refers to a vinyl-based monomer other than the aforementioned vinyl-based monomer having a carboxyl group, a carboxylic anhydride group, or a sulfonic acid group. The second vinyl-based monomer unit may include a unit of the other vinyl-based monomer or may include a unit derived from two or more different second vinyl-based monomers.

The amount of the second vinyl-based monomer unit in the polymer block (B) is preferably in the range from 0 mole % to 100 mole %, more preferably in the range from 50 mole % to 100 mole %, and most preferably in the range from 70 mole % to 100 mole %, based on the total number of moles of all the structural units in the polymer block (B).

Examples of the second vinyl-based monomer may include: styrene-based monomers such as styrene; (meth) acrylonitrile; vinyl esters such as vinyl acetate and vinyl pivalate; (meth)acrylic esters such as methyl (meth)acrylate, ethyl (meth)acrylate, 2-hydroxyethyl(meth)acrylate, n-propyl(meth)acrylate, iso-propyl(meth)acrylate, n-butyl(meth) acrylate, iso-butyl(meth)acrylate, tert-butyl(meth)acrylate, dodecyl(meth)acrylate, and 2-ethylhexyl(meth)acrylate; (meth)acrylamide; N-vinylpyrrolidone, and the like, and one or two or more of them may be used. Among them, (meth) acrylic esters, (meth)acrylamide, and N-vinylpyrrolidone are preferred, and (meth)acrylic esters are more preferred. Preferred specific examples of the (meth)acrylic esters include methyl (meth)acrylate, ethyl (meth)acrylate, 2-hydroxyethyl (meth)acrylate, n-propyl(meth)acrylate, iso-propyl(meth) acrylate, n-butyl(meth)acrylate, iso-butyl(meth)acrylate, and tert-butyl(meth)acrylate.

In the present invention, (meth)acrylate means acrylate or methacrylate. (Meth)acrylic means acrylic or methacrylic. A (meth)acryloyl group means an acryloyl group or a methacryloyl group.

The weight-average molecular weight of the polymer block (A) is preferably in the range of 1,000 to 100,000 and more preferably in the range of 4,000 to 70,000. The weight-average molecular weight of the polymer block (B) is preferably in the range of 1,000 to 100,000 and more preferably in the range of 3,500 to 70,000. The weight-average molecular weight of the polymer block (A) is the weight-average molecular weight of the polymer block (A) in the block copolymer (C), and the weight-average molecular weight of the polymer block (B) is the weight-average molecular weight of the polymer block (B) in the block copolymer (C).

The weight-average molecular weight of the block copolymer (C) is preferably in the range from 5,000 to 100,000, and more preferably in the range from 8,000 to 70,000. A weight-average molecular weight of the block copolymer (C) exceeding 100,000 causes, for example, a problem in that the viscosity of a solution obtained by mixing with the active energy ray curable compound (D) becomes high or that the block copolymer (C) is not easily dissolved in the solution to cause unstable solution properties. Therefore, it is difficult to apply the solution to a base material. If the weight-average molecular weight of the block copolymer (C) is less than 5,000, sufficient cohesive force is not obtained, and the adhesion to a polyolefin base material is not obtained. The weight-average molecular weight used in the present invention is a value determined by gel permeation chromatography (GPC) using a standard polystyrene calibration curve.

Although the melting point (Tm) of the polymer block (A) in the block copolymer (C) is not particularly limited, 120° C. or lower is preferable. If the melting point of the polymer block (A) is higher than 120° C., the crystallinity of the polymer block (A) becomes very high. Therefore, the block copolymer (C) containing such a polymer block (A) may not be easily dissolved in the active energy ray curable compound (D). The melting point can be measured using a differential scanning calorimeter (DSC).

In the present invention, the method of producing the block copolymer (C) is not particularly limited so long as the block copolymer (C) is composed of the polymer block (A) and the polymer block (B). For example, the block copolymer (C) can be produced by radical polymerization of a monomer component constituting the polymer block (B) in the presence of a polymer block (A') composed mainly of an olefin-based monomer unit and having a mercapto group at the terminal end. With this method, a block copolymer (C) having the desired weight-average molecular weight and molecular weight distribution can be easily and efficiently produced. Also with this method, various polyolefins, including commercial products, subjected to the degradation described above can be used as the polymer block (A), and the structure and melting point of the polymer block (A) can be freely selected as compared to when the block copolymer is produced by living polymerization.

The polymer block (A') having a mercapto group at its terminal end can be produced by various methods. Examples of the production method of the polymer block (A') may include: a method which includes introducing a double bond at the terminal end of a polymer composed mainly of the olefin-based monomer unit, adding thioacetic acid, thiobenzoic acid, thiopropionic acid, thiobutyric acid, thiovaleric acid, or the like via the double bond, and then treating the resultant polymer with an acid or alkali; and a method which includes polymerizing a monomer component constituting the polymer block (A) by anionic polymerization with using ethylene sulfide as a terminator.

The radical polymerization of the monomer component constituting the polymer block (B) in the presence of the polymer block (A') having a mercapto group at its terminal end can be performed using any known method. An example of the radical polymerization method is a solution method that includes dissolving the polymer block (A') having a mercapto group at its terminal end in an organic solvent such as toluene and xylene, and then, adding the monomer component constituting the polymer block (B), and adding a radical generator under stirring. Another example is a melting method that include heating the polymer block (A') having a mercapto group at its terminal end to its melting point or higher to melt it without the use of a solvent, and then, adding the monomer component constituting the polymer block (B), and adding a radical generator under stirring.

The radical generator may be selected from known radical generators, and an azo-based initiator is preferred. Examples of the azo-based initiator may include 2,2'-azobis(4-methoxy-2,4-dimethylvaleronitrile), 2,2'-azobis(2,4-dimethylvaleronitrile), dimethyl-2,2'-azobis(2-methylpropionate), 2,2'-azobis(2-methylbutyronitrile), 1,1'-azobis(cyclohexane-1-carbonitrile), 2,2'-azobis(N-butyl-2-methylpropionamide), and 2,2'-azobis(N-cyclohexyl-2-methylpropionamide). Depending on a temperature of the radical polymerization, an azo-based initiator having a proper half-life temperature may be selected.

The block copolymer (C) is composed of the polymer block (A) and the polymer block (B). Although the ratio of the amounts of these blocks is not particularly limited, the amount of the polymer block (B) is preferably from 30 parts by weight to 200 parts by weight based on 100 parts by weight of the polymer block (A), and more preferably from 50 parts by weight to 200 parts by weight based on 100 parts by weight of the polymer block (A). In such a case, an active energy ray curable resin composition having good solution properties and exhibiting good adhesion to a polyolefin base material after curing can be obtained.

The active energy ray curable compound (D) in the present invention is a compound that is curable by irradiation with active energy rays such as ultraviolet rays or electron beams. No particular limitation is imposed on the mechanism of curing, and the curing mechanism may be radical polymerization or cationic polymerization. An example of the active energy ray curable compound that is cured by radical polymerization is a compound having an ethylenic unsaturated group. Specific examples of the compound having an ethylenic unsaturated group may include: compounds having a vinyl group such as (meth)acrylate, vinyl ethers, and N-vinylpyrrolidone; and (meth)allyl compounds.

Examples of the (meth)acrylate include: a compound having one (meth)acryloyl group (hereinafter referred to as mono(meth)acrylate); and a compound having two or more (meth)acryloyl groups (hereinafter referred to as poly(meth)acrylate).

Examples of the mono(meth)acrylate may include:

alkyl(meth)acrylates such as methyl (meth)acrylate, ethyl (meth)acrylate, propyl(meth)acrylate, and butyl (meth)acrylate;

hydroxyalkyl(meth)acrylates such as 2-hydroxyethyl (meth)acrylate, 2-hydroxypropyl(meth)acrylate, and 1,4-butanediol mono(meth)acrylate;

aromatic mono(meth)acrylates such as phenol ethylene oxide modified (meth)acrylate, paracumylphenol ethylene oxide modified (meth)acrylate, and nonylphenol ethylene oxide modified (meth)acrylate;

alicyclic mono(meth)acrylates such as isobornyl acrylate; tetrahydrofurfuryl(meth)acrylate; carbitol(meth)acrylate; (meth)acryloyl morpholine; maleimide(meth)acrylate; and glycidyl(meth)acrylate.

Examples of the poly(meth)acrylate may include:

aromatic di(meth)acrylates such as bisphenol A alkylene oxide-modified di(meth)acrylates, bisphenol F alkylene oxide-modified di(meth)acrylates, and bisphenol Z alkylene oxide-modified (added) di(meth)acrylates;

alkylene glycol di(meth)acrylates such as ethylene glycol di(meth)acrylate and propylene glycol di(meth)acrylate;

polyalkylene glycol di(meth)acrylates such as diethylene glycol di(meth)acrylate, dipropylene glycol di(meth)acrylate, tripropylene glycol di(meth)acrylate, polyethylene glycol di(meth)acrylate, and polypropylene glycol di(meth)acrylate;

alkyl di(meth)acrylates such as 1,4-butanediol di(meth)acrylate, 1,6-hexanediol di(meth)acrylate, and 1,9-nonanediol di(meth)acrylate;

(meth)acrylates having two (meth)acryloyl groups such as isocyanuric acid ethylene oxide-modified (added) di(meth)acrylate, pentaerythritol di(meth)acrylate monostearate, and polyethylene glycol di(meth)acrylate;

(meth)acrylates having three (meth)acryloyl groups such as pentaerythritol tri(meth)acrylate, trimethylolpropane tri(meth)acrylate, isocyanuric acid alkylene oxide-modified (added) tri(meth)acrylates, and trimethylolpropane alkylene oxide-modified (added) tri(meth)acrylates; and (meth)acrylates having four or more (meth)acryloyl groups such as dipentaerythritol hexa(meth)acrylate and di(trimethylolpropane) tetra(meth)acrylate.

Examples of the alkylene oxide-modified (added) products in the above specific examples include ethylene oxide addition products and propylene oxide addition products.

Oligomers such as urethane(meth)acrylate oligomers, polyester (meth)acrylate oligomers, and epoxy(meth)acrylate oligomers may also be used as (meth)acrylate.

Examples of the urethane (meth)acrylate oligomers include a reaction product obtained by reacting a polyol with organic polyisocyanate and then reacting the resultant reaction product with hydroxyl group-containing (meth)acrylate.

Examples of the polyol may include low-molecular weight polyols, polyether polyols, and polyester polyols.

Examples of the low-molecular weight polyols may include ethylene glycol, propylene glycol, cyclohexane dimethanol, and 3-methyl-1,5-pentanediol.

Examples of the polyether polyols may include polyethylene glycol, polypropylene glycol, and polytetramethylene glycol.

Examples of the polyester polyols may include reaction products of the above-described low-molecular weight polyols and/or the above-described polyether polyols with acid components. Examples of the acid components may include dibasic acids and anhydrides thereof. Specific examples of the dibasic acids may include adipic acid, succinic acid, phthalic acid, hexahydrophthalic acid, and terephthalic acid.

Examples of the organic polyisocyanate may include tolylene diisocyanate, 4,4'-diphenylmethane diisocyanate, 4,4'-dicyclohexylmethane diisocyanate, hexamethylene diisocyanate, and isophorone diisocyanate.

Examples of the hydroxyl group-containing (meth)acrylate may include hydroxyalkyl(meth)acrylates such as 2-hydroxyethyl(meth)acrylate and 2-hydroxypropyl(meth)acrylate.

Examples of the polyester (meth)acrylate oligomers may include dehydrated condensates of polyester polyols and (meth)acrylic acid.

Examples of the polyester polyols may include reaction products of polyols with acid components. Examples of the polyols may include low-molecular weight polyols and alkylene oxide adducts thereof. Specific examples of the low-molecular weight polyols may include ethylene glycol, polyethylene glycol, cyclohexane dimethanol, 3-methyl-1,5-pentanediol, propylene glycol, polypropylene glycol, 1,6-hexanediol, and trimethylolpropane. Examples of the acid components may include dibasic acids and anhydrides thereof. Specific examples of the dibasic acids include adipic acid, succinic acid, phthalic acid, hexahydrophthalic acid, and terephthalic acid.

The epoxy acrylate is obtained by addition reaction of epoxy resin with (meth)acrylic acid. Examples of the epoxy acrylate may include (meth)acrylates of bisphenol A-type epoxy resins, (meth)acrylates of phenol novolac-type and cresol novolac-type epoxy resins, and (meth)acrylic acid adducts of alkylene glycol diglycidyl ethers.

Examples of the vinyl ethers may include ethylene glycol divinyl ether, triethylene glycol divinyl ether, dipropylene glycol divinyl ether, cyclohexane dimethanol divinyl ether, dodecyl vinyl ether, 4-hydroxybutyl vinyl ether, 2-(2'-vinyloxyethoxy)ethyl acrylate, and 2-(2'-vinyloxyethoxy)ethyl methacrylate.

Examples of the active energy ray curable compound (D) in the present invention that is curable by cationic polymerization may include epoxy-containing compounds, and vinyl ether compounds.

Examples of the epoxy-containing compounds may include bisphenol A-type epoxy, bisphenol BA-type epoxy, bisphenol F-type epoxy, bisphenol AD-type epoxy, phenol novolac-type epoxy, cresol novolac-type epoxy, alicyclic epoxy, fluorene-based epoxy, naphthalene-based epoxy, glycidyl ester compounds, glycidyl amine compounds, heterocyclic epoxy, and α-olefin epoxy.

Examples of the vinyl ether compounds may include 2-ethylhexyl vinyl ether, butanediol-1,4-divinyl ether, cyclohexane dimethanol monovinyl ether, diethylene glycol monovinyl ether, diethylene glycol monovinyl ether, diethylene glycol divinyl ether, dipropylene glycol divinyl ether, dodecyl vinyl ether, ethyl vinyl ether, hexanediol divinyl ether, hydroxybutyl vinyl ether, hydroxyethyl vinyl ether, isobutyl vinyl ether, methyl vinyl ether, octadecyl vinyl ether, propyl vinyl ether, triethylene glycol divinyl ether, vinyl 4-hydroxybutyl ether, vinyl cyclohexyl ether, vinyl propionate, vinyl carbazole, and vinylpyrrolidone.

Among the above compounds, poly(meth)acrylates are preferred as the active energy ray curable compound (D) in the present invention. Particularly, 1,6-hexanediol di(meth)acrylate, 1,9-nonanediol di(meth)acrylate, tripropylene glycol di(meth)acrylate, trimethylolpropane tri(meth)acrylate, and trimethylolpropane alkylene oxide-modified tri(meth)acrylates are preferred as the active energy ray curable compound (D) in light of the solution properties of a composition formed by mixing with the block copolymer (C) and the stability of the solution properties.

The active energy ray curable compound (D) may be a single type of compound or two or more types of compounds. The use of two or more types of compounds allows the solution properties of the active energy ray curable resin composition, its curing properties during irradiation with active energy rays, and the properties of the cured coating film to be controlled.

The method of producing the active energy ray curable resin composition of the present invention is not particularly limited. The active energy ray curable resin composition can be produced by mixing the block copolymer (C) with the active energy ray curable compound (D) using any known method. The block copolymer (C) and the active energy ray curable compound (D) are mixed generally at high temperature (for example, 120° C. or lower, preferably from 50° C. to 110° C.) under stirring if necessary. For example, the active energy ray curable resin composition of the present invention can be obtained by adding a part of the energy ray curable compound (D) to the block copolymer (C) in an air atmosphere at high temperature (for example, 120° C. or lower, preferably from 50° C. to 110° C.), melting the mixture, under stirring if necessary, and then, adding the rest of the required energy ray curable compound (D), stirring, and cooling the mixture. A composition containing substantially no solvent can also be prepared by adding a melting aid to the block copolymer (C), melting the mixture at high temperature (for example, 120° C. or lower, preferably from 50° C. to 110° C.), adding the active energy ray curable compound (D) dropwise to the mixture, evaporating the melting aid, and cooling the resultant mixture. The method of evaporating the melting aid may be selected from known methods such as atmospheric evaporation and evaporation under reduced pressure according to the heating temperature during production of the composition.

The melting aid used can be appropriately selected from melting aids that can melt the block copolymer (C) at the heating temperature during production of the composition and can be evaporated after the active energy ray curable compound (D) is added dropwise. Preferably, such a melting aid is at least one selected from the following solvents: ether-based solvents such as tetrahydrofuran and diethyl ether; ketone-based solvents such as acetone, methyl ethyl ketone, and methyl isobutyl ketone; ester-based solvents such as ethyl acetate, propyl acetate, and butyl acetate; alcohol-based solvents such as t-butyl alcohol and isopropyl alcohol; aliphatic hydrocarbon-based solvents such as n-hexane, n-heptane, cyclohexane, methylcyclohexane, and ethylcyclohexane; and aromatic-based solvents such as toluene and xylene.

The addition of the block copolymer (C) to the active energy ray curable resin composition can impart, to the composition, adhesion to a polyolefin base material. Although the amount of the block copolymer (C) in the active energy ray curable resin composition of the present invention is not particularly limited, the amount of the block copolymer (C) is preferably from 0.1 wt % to 40 wt %, and more preferably from 1 wt % to 30 wt %. If the amount thereof is less than 0.1 wt %, the adhesion of the active energy ray curable resin composition to a polyolefin base material may deteriorate. If the amount thereof is larger than 40 wt %, the hardness of a cured coating film composed of the active energy ray curable resin composition cured with active energy rays may be insufficient.

Although the amount of the active energy ray curable compound (D) in the active energy ray curable resin composition is not particularly limited, the amount of the active energy ray curable compound (D) is preferably from 50 wt % to 99.8 wt %, and more preferably from 60 wt % to 95 wt %. If the amount thereof is less than 50 wt %, the hardness of a cured coating film composed of the active energy ray curable resin composition cured with active energy rays may be insufficient. If the amount thereof exceeds 99.8 wt %, the relative amount of the block copolymer (C) becomes small, and therefore the adhesion of the active energy ray curable resin composition to a polyolefin base material may deteriorate.

When the composition of the present invention is cured with ultraviolet rays, a photo-polymerization initiator (E) may be added. The photo-polymerization initiator (E) may be appropriately selected according to the curing mechanism, such as radical polymerization or cationic polymerization, of the active energy ray curable compound (D).

Examples of the photo-polymerization initiator (E) that initiates radical polymerization may include:

benzoin and alkyl ethers thereof such as benzoin, benzoin methyl ether, benzoin ethyl ether, and benzoin isopropyl ether;

acetophenones such as acetophenone, 2,2-dimethoxy-2-phenyl acetophenone, 2,2-diethoxy-2-phenyl acetophenone, 1,1-dichloro acetophenone, 1-hydroxy acetophenone, 1-hydroxy cyclohexyl phenyl ketone, and 2-methyl-1-[4-(methylthio)phenyl]-2-morpholino-propane-1-one;

anthraquinones such as 2-methyl anthraquinone, 2-ethyl anthraquinone, 2-tert-butyl anthraquinone, 1-chloro anthraquinone, and 2-amyl anthraquinone;

thioxanthones such as 2,4-dimethyl thioxanthone, 2,4-diethyl thioxanthone, 2-chloro thioxanthone, and 2,4-diisopropyl thioxanthone;

ketals such as acetophenone dimethyl ketal and benzyl dimethyl ketal;

monoacylphosphine oxides and bisacylphosphine oxides such as 2,4,6-trimethyl benzoyl diphenyl phosphine oxide;

benzophenones such as benzophenone; and xanthones.

The photo-polymerization initiator (E) that initiates cationic polymerization is not particularly limited so long as it is a compound that can generate cationic species by irradiation with ultraviolet rays, and onium salts are well-known initiators. Examples of the onium salts may include diazonium salts of Lewis acids, iodonium salts of Lewis acids, and sulfonium salts of Lewis acids. Specific examples include a phenyl diazonium salt of boron tetrafluoride, a diphenyl iodonium salt of phosphorus hexafluoride, a diphenyl iodonium salt of antimony hexafluoride, a tri-4-methyl phenyl sulfonium salt of arsenic hexafluoride, and a tri-4-methyl phenyl sulfonium salt of antimony tetrafluoride.

These photo-polymerization initiators (E) may be used alone or in combination with, for example, a benzoic acid-based or amine-based photo-polymerization initiating-promoting agent.

The amount of the photo-polymerization initiator (E) is preferably from 0.1 parts by weight to 10 parts by weight based on 100 parts by weight of the active energy ray curable resin composition, and more preferably from 0.5 parts by weight to 5 parts by weight based on 100 parts by weight of the active energy ray curable resin composition.

Various components other than the above-described components may be added as necessary to the active energy ray curable resin composition, according to its application. Examples of such components include various additives such as: fillers such as barium sulfate, silicon oxide, talc, clay, and calcium carbonate; coloring pigments such as phthalocyanine-blue, phthalocyanine-green, titanium oxide, and carbon black; polymerization inhibitors such as hydroquinone, hydroquinone monomethyl ether, phenothiazine, and an aluminum salt of N-nitrosophenyl hydroxylamine; an adhesion imparting agent; and a leveling agent. If necessary, urethane, polyester, epoxy, and the like may be added for the purpose of imparting heat resistance and flexibility to a cured coating film and improving the dispersion properties of pigment.

The active energy ray curable resin composition can be applied to the surfaces of base materials and molded products. Although the materials for the base materials and molded products is not particularly limited, to achieve the effect of improving adhesion, base materials and molded products containing a polyolefin-based resin (hereinafter, a molded product containing a polyolefin-based resin may be referred to as a "polyolefin molded product") are preferred. The shape of the base materials and molded products is not particularly limited, and film-shaped and sheet-shaped base materials and molded products, for example, may be used.

To coat a base material with the active energy ray curable resin composition of the present invention, a coating method such as brushing, bar coating, air spray coating, electrostatic coating, dipping, dip coating, spin coating, or curtain coating is used. The base material coated in this manner is irradiated with active energy rays such as ultraviolet rays or electron beams to form a cured coating film. Any known irradiation apparatus generally used in the art may be used for the irradiation with active energy rays such as ultraviolet rays or electron beams. For example, ultraviolet rays having a wavelength from 200 nm to 450 nm is applied for 0.1 seconds to 60 seconds to give an energy dose from 30 mJ/cm² to 5,000 mJ/cm², whereby a cured coating film can be formed. Examples of the light source of the ultraviolet rays may include a mercury arc lamp, a high pressure mercury lamp, a medium pressure mercury lamp, a low pressure mercury lamp, and a metal halide lamp. The thickness of the coating layer may be set as necessary but is generally from about 1 µm to about 200 µm.

The active energy ray curable resin composition of the present invention has good solution properties and can form a cured coating film exhibiting good adhesion when applied to the surface of a polyolefin base material or molded product. Therefore, when added to a paint, ink, adhesive, or sealant for a polyolefin base material or a polyolefin molded product, the active energy ray curable resin composition of the present invention can be used as a binder composition. In addition, the active energy ray curable resin composition can be used as a primer for coating a polyolefin base material or a polyolefin molded product.

EXAMPLES

The present invention will now be described in detail by way of Examples, but the invention is not limited thereto. In the following Reference Examples, melting point measurement was performed in the following manner.

(Melting Point Measurement Method)

The melting point (Tm) was measured using a differential scanning calorimeter (DSC, product of Seiko Instruments Inc.). More specifically, about 10 mg of a sample was melted at 200° C. for 5 minutes, and then the temperature was reduced to −60° C. at a rate of 10° C./min to crystallize the sample. Then the temperature was raised to 200° C. at 10° C./min to melt the sample, and the melting peak temperature was measured. This melting peak temperature was denoted as Tm and evaluated.

(Weight-Average Molecular Weight Measurement Method)

The weight-average molecular weight was determined by a GPC method, using a gel permeation chromatography apparatus (product name: HLC-8120GPC, TOSHO), based on a standard polystyrene calibration curve. The weight-average molecular weights of block copolymers (1) to (7) shown in Reference Examples 1 to 7 are measurement values for these respective copolymers. The weight-average molecular weights of the polymer blocks (A) shown in Reference Examples 1 to 7 and 9 are measurement values of the weight-average molecular weights of polyolefins having thioacetyl groups at their terminal ends that are obtained during production. The weight-average molecular weights of the polymer blocks (B) shown in Reference Examples 1 to 7 are values computed as the differences of the measurement values of the weight-average molecular weights of the block copolymers (1) to (7) from the measurement values of the weight-average molecular weights of the polymer blocks (A).

Reference Example 1

Production of Block Copolymer

Melting Point: 65° C., Polyolefin Block/Methyl Acrylate-Acrylic Acid Block Copolymer (1) A propylene-based copolymer (propylene component: 88 mole %, ethylene component: 12 mole %, weight-average molecular weight: 150,000, Tm=65° C.) produced using a metallocene catalyst as a polymerization catalyst was supplied to a twin screw extruder, melted and kneaded at 420° C., and thermally decomposed, thus producing polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours to produce polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. 10 Parts by weight of a 4% n-butanol solution of potassium hydroxide was added to the mixture, and the resultant mixture was allowed to react at 110° C. in nitrogen for 1 hour, thus producing polyolefin having a mercapto group at the terminal end.

(4) One hundred parts by weight of the polyolefin having a mercapto group at the terminal end, obtained in the above (3), was dissolved in 250 parts by weight of toluene. Seventy parts by weight of methyl acrylate and 2.5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and a methyl acrylate-acrylic acid block (B) (hereinafter referred to as a "block copolymer (1)") was thereby obtained. The weight-average molecular weight of the polymer block (A) in the obtained block copolymer (1) was 33,000, the weight-average molecular weight of the polymer block (B) was 21,000, and the weight-average molecular weight of the block copolymer (1) was 54,000. The melting point of the polymer block (A) was 65° C.

Reference Example 2

Production of Block Copolymer

Melting Point: 75° C., Polyolefin Block/Ethyl Acrylate-Acrylic Acid Block Copolymer (1) A propylene-based copolymer (propylene component: 92 mole %, ethylene component: 8 mole %, weight-average molecular weight: 80,000, Tm=75° C.) produced using a metallocene catalyst as a polymerization catalyst was supplied to a twin screw extruder, melted and kneaded at 420° C., and thermally decomposed, thus producing polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour, thus producing polyolefin having a mercapto group at the terminal end.

(4) One hundred parts by weight of the polyolefin having a mercapto group at the terminal end, obtained in the above (3), was dissolved in 250 parts by weight of toluene. Eighty five parts by weight of ethyl acrylate and 5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (2)") was thereby obtained. The weight-average molecular weight of the polymer block (A) in the obtained block copolymer (2) was 18,000, the weight-average molecular weight of the polymer block (B) was 16,000, and the weight-average molecular weight of the block copolymer (2) was 34,000. The melting point of the polymer block (A) was 65° C.

Reference Example 3

Production of Block Copolymer

Melting Point: 70° C., Polypropylene Block/T-Butyl Acrylate-Acrylic Acid Block Copolymer (1) Polypropylene (average molecular weight: 100,000, Tm=70° C.) produced using a metallocene catalyst as a polymerization catalyst was supplied to a twin screw extruder, melted and kneaded at 420° C., and thermally decomposed, thus producing polypropylene each having a double bond at the terminal end.

(2) One hundred parts by weight of the polypropylene having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polypropylene having a thioacetyl group at the terminal end.

(3) One hundred parts by weight of the polypropylene having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour, thus producing polypropylene having a mercapto group at the terminal end.

(4) One hundred parts by weight of the polypropylene having a mercapto group at the terminal end, obtained in the above (3), was dissolved in 250 parts by weight of toluene. One hundred parts by weight of t-butyl acrylate and 10 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polypropylene block (A) and a t-butyl acrylate-acrylic acid block (B) (hereinafter referred to as a "block copolymer (3)") was thereby obtained. The weight-average molecular weight of the polymer block (A) in the obtained block copolymer (3) was 22,000, the weight-average molecular weight of the polymer block (B) was 23,000, and the weight-average molecular weight of the block copolymer (3) was 45,000. The melting point of the polymer block (A) was 70° C.

Reference Example 4

Production of Block Copolymer

Melting Point: 75° C., Polyolefin Block/Ethyl Acrylate-Acrylic Acid Block Copolymer (1) A propylene-based copolymer (propylene component: 92 mole %, ethylene component: 8 mole %, weight-average molecular weight: 200,000, Tm=75° C.) produced using a metallocene catalyst as a polymerization catalyst was supplied to a twin screw extruder, melted and kneaded at 400° C., and thermally decomposed, thus producing polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours to produce polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour, thus producing polyolefin having a mercapto group at the terminal end.

(4) One hundred parts by weight of the polyolefin having a mercapto group at the terminal end, obtained in the above (3), was dissolved in 250 parts by weight of toluene. Eighty five parts by weight of ethyl acrylate and 5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (4)") was thereby obtained. The weight-average molecular weight of the polymer block (A) in the obtained block copolymer (4) was 52,000, the weight-average molecular weight of the polymer block (B) was 44,000, and the weight-average molecular weight of the block copolymer (4) was 96,000. The melting point of the polymer block (A) was 75° C.

Reference Example 5

Production of Block Copolymer

Melting Point: 65° C., Polyolefin Block/Ethyl Acrylate-Acrylic Acid Block Copolymer (1) A propylene-based copolymer (propylene component: 88 mole %, ethylene component: 12 mole %, weight-average molecular weight: 20,000, Tm=65° C.) produced using a metallocene catalyst as a polymerization catalyst was supplied to a twin screw extruder, melted and kneaded at 420° C., and thermally decomposed to produce polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. 10 Parts by weight of a 4% n-butanol solution of potassium hydroxide was added to the mixture, and the resultant mixture was allowed to react at 110° C. in nitrogen for 1 hour, thus producing polyolefin having a mercapto group at the terminal end.

(4) One hundred parts by weight of the polyolefin having a mercapto group at the terminal end, obtained in the above (3), was dissolved in 250 parts by weight of toluene. 85 Parts by weight of ethyl acrylate and 5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (5)") was thereby obtained. The weight-average molecular weight of the polymer block (A) in the obtained block copolymer (5) was 4,400, the weight-average molecular weight of the polymer block (B) was 3,800, and the weight-average molecular weight of the block copolymer (5) was 8,200. The melting point of the polymer block (A) was 65° C.

Reference Example 6

Production of Block Copolymer

Melting Point: 75° C., Polyolefin Block/Ethyl Acrylate-Acrylic Acid Block Copolymer (1) A propylene-based copolymer (propylene component: 92 mole %, ethylene component: 8 mole %, weight-average molecular weight: 200,000, Tm=75° C.) produced using a metallocene catalyst as a polymerization catalyst was supplied to a twin screw extruder, melted and kneaded at 380° C., and thermally decomposed, thus producing polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour, thus producing polyolefin having a mercapto group at terminal end.

(4) One hundred parts by weight of the polyolefin having a mercapto group at the terminal end, obtained in the above (3), was dissolved in 250 parts by weight of toluene. Eighty five parts by weight of ethyl acrylate and 5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (6)") was thereby obtained. The weight-average molecular weight of the polymer block (A) in the obtained block copolymer (6) was 60,000, the weight-average molecular weight of the polymer block (B) was 51,000, and the weight-average molecular weight of the block copolymer (6) was 111,000. The melting point of the polymer block (A) was 75° C.

Reference Example 7

Production of Block Copolymer

Melting Point: 65° C., Polyolefin Block/Ethyl Acrylate-Acrylic Acid Block Copolymer (1) A propylene-based copolymer (propylene component: 88 mole %, ethylene component: 12 mole %, weight-average molecular weight: 20,000, Tm=65° C.) produced using a metallocene catalyst as a polymerization catalyst was supplied to a twin screw extruder, melted and kneaded at 450° C., and thermally decomposed to produce polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour to produce polyolefin having a mercapto group at terminal end.

(4) One hundred parts by weight of the polyolefin having a mercapto group at the terminal end, obtained in the above (3), was dissolved in 250 parts by weight of toluene. Eighty five parts by weight of ethyl acrylate and 5 parts by weight of acrylic acid were added thereto, and 2,2'-azobis(2,4-dimethylvaleronitrile) was added to the mixture at 90° C. in nitrogen such that the rate of polymerization per hour was 10 to 20%. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (7)") was thereby obtained. The weight-average molecular weight of the polymer block (A) in the obtained block copolymer (7) was 2,500, the weight-average molecular weight of the polymer block (B) was 2,100, and the weight-average molecular weight of the block copolymer (7) was 4,600. The melting point of the polymer block (A) was 65° C.

Reference Example 8

A modified polyolefin resin composition described in Production Example 3 in Patent Document 2 was prepared as follows.

A twin screw extruder (L/D=34, φ=40 mm) was charged with 100 parts by weight of an olefin-based polymer (propylene component: 68 mole %, ethylene component: 8 mole %, butene component: 24 mole %, weight-average molecular weight: 50,000), 8 parts by weight of maleic anhydride, 8 parts by weight of lauryl methacrylate, and 1.5 parts by weight of dicumyl peroxide. Reaction was performed at a barrel temperature of 180° C. (first to seventh barrels) with residence time set to 10 minutes, and degassing was performed in the seventh barrel to remove remaining unreacted materials. The weight-average molecular weight of the obtained modified polyolefin resin composition was 49,000, the graft weight of the maleic anhydride was 5.2 wt %, and the graft weight of the lauryl methacrylate was 6.2 wt %.

Reference Example 9

Production of Block Copolymer

Melting Point: 75° C., Polyolefin Block/Ethyl Acrylate Block Copolymer (1) A propylene-based copolymer (propylene component: 92 mole %, ethylene component: 8 mole %, weight-average molecular weight: 80,000, Tm=75° C.) produced using a metallocene catalyst as a polymerization catalyst was supplied to a twin screw extruder, melted and kneaded at 420° C., and thermally decomposed to produce polyolefin each having a double bond at the terminal end.

(2) One hundred parts by weight of the polyolefin having a double bond at the terminal end, which was obtained in the above (1), 300 parts by weight of xylene, and 10 parts by weight of thioacetic acid were placed in a reaction vessel. The air inside the vessel was sufficiently replaced with nitrogen, and then 0.2 parts by weight of 2,2'-azobisisobutyronitrile was added. The mixture was allowed to react at 90° C. for 2 hours, thus producing polyolefin having a thioacetyl group at the terminal end.

(3) One hundred parts by weight of the polyolefin having a thioacetyl group at the terminal end, obtained in the above (2), was dissolved in a solvent mixture of 200 parts by weight of xylene and 20 parts by weight of n-butanol. Ten parts by weight of a 4% n-butanol solution of potassium hydroxide was added to the mixture, and the resultant mixture was allowed to react at 110° C. in nitrogen for 1 hour, thus producing polyolefin having a mercapto group at the terminal end.

(4) One hundred parts by weight of the polyolefin having a mercapto group at the terminal end, obtained in the above (3), was dissolved in 250 parts by weight of toluene. Two hundred parts by weight of ethyl acrylate was added thereto. 2,2'-Azobis(2,4-dimethylvaleronitrile) was added to the mixture at 90° C. in nitrogen such that the rate of polymerization per hour was 10 to 20%, and the mixture was thereby polymerized. The reaction was stopped when the degree of polymerization reached 95%. After the reaction mixture was cooled, the solvents were removed, and an AB-type diblock copolymer composed of a polyolefin block (A) and an ethyl acrylate-acrylic acid block (B) (hereinafter referred to as a "block copolymer (9)") was thereby obtained. The weight-average molecular weight of the polymer block (A) in the obtained block copolymer (9) was 18,000, the weight-average molecular weight of the polymer block (B) was 32,000, and the weight-average molecular weight of the block copolymer (9) was 50,000. The melting point of the polymer block (A) was 65° C.

TABLE 1

MONOMER COMPOSITION OF POLYMER BLOCK (B) AND WEIGHT-AVERAGE MOLECULAR WEIGHT OF BLOCK COPOLYMER (C)

| | UPPER ROW: MONOMERS CONSTITUTING POLYMER BLOCK (B) (PARTS ADDED (PARTS BY WEIGHT)) LOWER ROW: MOLAR RATIO (MOL %) OF MONOMER CONTAINED IN (B) | | | | WEIGHT-AVERAGE MOLECULAR WEIGHT OF BLOCK COPOLYMER (C) |
|---|---|---|---|---|---|
| | MA | EA | t-BA | AA | |
| REFERENCE EXAMPLE 1 | 70 (96) | | | 2.5 (4) | 54,000 |
| REFERENCE EXAMPLE 2 | | 85 (92.5) | | 5 (7.5) | 34,000 |
| REFERENCE EXAMPLE 3 | | | 100 (85) | 10 (15) | 45,000 |
| REFERENCE EXAMPLE 4 | | 85 (92.5) | | 5 (7.5) | 96,000 |
| REFERENCE EXAMPLE 5 | | 85 (92.5) | | 5 (7.5) | 8,200 |
| REFERENCE EXAMPLE 6 | | 85 (92.5) | | 5 (7.5) | 111,000 |
| REFERENCE EXAMPLE 7 | | 85 (92.5) | | 5 (7.5) | 4,600 |
| REFERENCE EXAMPLE 8 | | | | | 49,000* |
| REFERENCE EXAMPLE 9 | | 200 (100) | | | 50,000 |

[Footnote to Table 1 and abbreviations]
"*" indicates the weight-average molecular weight of modified polyolefin resin composition
MA: methyl acrylate
EA: ethyl acrylate
t-BA: t-butyl acrylate
AA: acrylic acid Test Example 1

Examples 1 to 7 and Comparative Examples 1 to 3

Solution Properties and Transparency Test

Two hundred parts by weight of ethyl acetate used as a melting aid was added to 100 parts by weight of each of the block copolymers produced in Reference Examples 1 to 7 and 9, and the mixtures were heated and melted at 75° C. Then 400 parts by weight of the active energy ray curable compounds shown in Tables 2-1, 2-3, and 3 were added dropwise to the mixtures. After completion of dropwise addition, ethyl acetate was evaporated under reduced pressure, and the resultant mixtures were cooled to room temperature under stirring, thus preparing active energy ray curable resin compositions (Examples 1 to 6 and Comparative Examples 1 and 2).

Two hundred parts by weight of ethyl acetate used as a melting aid was added to 100 parts by weight of the block copolymer produced in Reference Example 5 to prepare mixtures, and the mixtures were heated and melted at 75° C. Then 200 parts by weight of the active energy ray curable compounds shown in Tables 2-1, 2-2, and 3 were added dropwise to the mixtures. After completion of dropwise addition, ethyl acetate was evaporated under reduced pressure, and the resultant mixtures were cooled to room temperature under stirring, thus preparing an active energy ray curable resin composition (Example 7).

Two hundred parts by weight of tetrahydrofuran used as a melting aid was added to 100 parts by weight of the modified polyolefin resin composition produced in Reference Example 8 to prepare mixtures, and the mixtures were heated and melted at 60° C. Then 400 parts by weight of the active energy ray curable compounds shown in Table 3 were added dropwise to the mixtures. After completion of dropwise addition, tetrahydrofuran was evaporated under reduced pressure, and the resultant mixtures were cooled to room temperature under stirring, thus preparing an active energy ray curable resin composition (Comparative Example 3).

After the active energy ray curable resin compositions were prepared, their solution properties and transparency were observed after the compositions were left to stand at 23° C. for 6 hours. The results are shown in Tables 2-1 and 2-2. The solution properties and transparency were also observed after the compositions were left to stand at 23° C. for 24 hours, and the results are shown in Tables 2-3 and 3. The measures of the solution properties and transparency are as follows.

[Solution Properties]
Good→Poor
Good fluidity>High viscosity>Solidified>Separated into two layers
[Transparency]
Transparent>Hazy>Slightly turbid>Cloudy

TABLE 2-2

SOLUTION PROPERTIES AND TRANSPARENCY OF ACTIVE ENERGY RAY CURABLE RESIN COMPOSITION (AFTER LEFT TO STAND AT 23° C. FOR 6 HOURS)

| | | SOLUTION PROPERTIES AND TRANSPARENCY OF ACTIVE ENERGY RAY CURABLE RESIN COMPOSITION UPPER ROW: SOLUTION PROPERTIES LOWER ROW: TRANSPARENCY | |
|---|---|---|---|
| | | EXAMPLE 6 | EXAMPLE 7 |
| BLOCK COPOLYMER (C) | | REFERENCE EXAMPLE 9 | REFERENCE EXAMPLE 5 |
| ACTIVE ENERGY RAY CURABLE RESIN COMPOUND (D) | HDDA | GOOD FLUIDITY HAZY | HIGH VISCOSITY SLIGHTLY TURBID |
| | TPGDA | GOOD FLUIDITY TRANSPARENT | GOOD FLUIDITY TRANSPARENT |
| | TMPTA | HIGH VISCOSITY TRANSPARENT | HIGH VISCOSITY TRANSPARENT |
| | PETA | HIGH VISCOSITY HAZY | HIGH VISCOSITY SLIGHTLY TURBID |
| | TMP (EO)TA | GOOD FLUIDITY TRANSPARENT | HIGH VISCOSITY TRANSPARENT |

TABLE 2-1

SOLUTION PROPERTIES AND TRANSPARENCY OF ACTIVE ENERGY RAY CURABLE RESIN COMPOSITION (AFTER LEFT TO STAND AT 23° C. FOR 6 HOURS)

| | | SOLUTION PROPERTIES AND TRANSPARENCY OF ACTIVE ENERGY RAY CURABLE RESIN COMPOSITION UPPER ROW: SOLUTION PROPERTIES LOWER ROW: TRANSPARENCY | | | | |
|---|---|---|---|---|---|---|
| | | EXAMPLE 1 | EXAMPLE 2 | EXAMPLE 3 | EXAMPLE 4 | EXAMPLE 5 |
| BLOCK COPOLYMER (C) | | REFERENCE EXAMPLE 1 | REFERENCE EXAMPLE 2 | REFERENCE EXAMPLE 3 | REFERENCE EXAMPLE 4 | REFERENCE EXAMPLE 5 |
| ACTIVE ENERGY RAY CURABLE RESIN COMPOUND (D) | HDDA | HIGH VISCOSITY SLIGHTLY TURBID | HIGH VISCOSITY SLIGHTLY TURBID | HIGH VISCOSITY SLIGHTLY TURBID | HIGH VISCOSITY SLIGHTLY TURBID | GOOD FLUIDITY HAZY |
| | TPGDA | GOOD FLUIDITY TRANSPARENT | GOOD FLUIDITY TRANSPARENT | GOOD FLUIDITY HAZY | GOOD FLUIDITY SLIGHTLY TURBID | GOOD FLUIDITY TRANSPARENT |
| | TMPTA | HIGH VISCOSITY TRANSPARENT | HIGH VISCOSITY TRANSPARENT | HIGH VISCOSITY HAZY | HIGH VISCOSITY SLIGHTLY TURBID | GOOD FLUIDITY TRANSPARENT |
| | PETA | HIGH VISCOSITY SLIGHTLY TURBID | HIGH VISCOSITY SLIGHTLY TURBID | HIGH VISCOSITY CLOUDY | HIGH VISCOSITY SLIGHTLY TURBID | GOOD FLUIDITY HAZY |
| | TMP (EO)TA | HIGH VISCOSITY TRANSPARENT | HIGH VISCOSITY TRANSPARENT | HIGH VISCOSITY HAZY | HIGH VISCOSITY SLIGHTLY TURBID | GOOD FLUIDITY TRANSPARENT |

TABLE 2-3

SOLUTION PROPERTIES AND TRANSPARENCY OF ACTIVE
ENERGY RAY CURABLE RESIN COMPOSITION
(AFTER LEFT TO STAND AT 23° C. FOR 24 HOURS)

SOLUTION PROPERTIES AND TRANSPARENCY OF
ACTIVE ENERGY RAY CURABLE RESIN COMPOSITION
UPPER ROW: SOLUTION PROPERTIES
LOWER ROW: TRANSPARENCY

| | | EXAMPLE 1 | EXAMPLE 2 | EXAMPLE 3 | EXAMPLE 4 | EXAMPLE 5 |
|---|---|---|---|---|---|---|
| BLOCK COPOLYMER (C) | | REFERENCE EXAMPLE 1 | REFERENCE EXAMPLE 2 | REFERENCE EXAMPLE 3 | REFERENCE EXAMPLE 4 | REFERENCE EXAMPLE 5 |
| ACTIVE ENERGY RAY CURABLE RESIN COMPOUND (D) | HDDA | HIGH VISCOSITY SLIGHTLY TURBID | HIGH VISCOSITY SLIGHTLY TURBID | HIGH VISCOSITY SLIGHTLY TURBID | HIGH VISCOSITY CLOUDY | GOOD FLUIDITY HAZY |
| | TPGDA | GOOD FLUIDITY TRANSPARENT | GOOD FLUIDITY TRANSPARENT | GOOD FLUIDITY HAZY | GOOD FLUIDITY CLOUDY | GOOD FLUIDITY TRANSPARENT |
| | TMPTA | HIGH VISCOSITY TRANSPARENT | HIGH VISCOSITY TRANSPARENT | HIGH VISCOSITY HAZY | HIGH VISCOSITY CLOUDY | GOOD FLUIDITY TRANSPARENT |
| | PETA | HIGH VISCOSITY SLIGHTLY TURBID | HIGH VISCOSITY SLIGHTLY TURBID | HIGH VISCOSITY CLOUDY | — | GOOD FLUIDITY HAZY |
| | TMP (EO)TA | HIGH VISCOSITY TRANSPARENT | HIGH VISCOSITY TRANSPARENT | HIGH VISCOSITY HAZY | HIGH VISCOSITY CLOUDY | GOOD FLUIDITY TRANSPARENT |

[Abbreviations in Tables 2-1 to 2-3]
HDDA: 1,6-hexanediol diacrylate
TPGDA: tripropylene glycol diacrylate
TMPTA: trimethylolpropane triacrylate
PETA: pentaerythritol triacrylate
TMP(EO)TA: trimethylolpropane ethylene oxide (EO)-added acrylate (VISCOAT V#360, product of OSAKA ORGANIC CHEMICAL INDUSTRY LTD.)

block copolymer and the compound active energy ray curable compound were dissolved into each other, and better solution properties were obtained as compared to those of the compositions in Comparative Examples 1 and 3. In each of the compositions in Examples 1 to 3 and 5, the stability of the solution properties was also good.

TABLE 3

SOLUTION PROPERTIES OF ACTIVE ENERGY RAY CURABLE RESIN COMPOSITION

SOLUTION PROPERTIES AND TRANSPARENCY OF
ACTIVE ENERGY RAY CURABLE RESIN
COMPOSITION
UPPER ROW: SOLUTION PROPERTIES
LOWER ROW: TRANSPARENCY

| | | COMPARATIVE EXAMPLE 1 | COMPARATIVE EXAMPLE 2 | COMPARATIVE EXAMPLE 3 |
|---|---|---|---|---|
| BLOCK COPOLYMER (C) | | REFERENCE EXAMPLE 6 | REFERENCE EXAMPLE 7 | REFERENCE EXAMPLE 8 |
| ACTIVE ENERGY RAY CURABLE RESIN COMPOUND (D) | HDDA | SOLIDIFIED — | GOOD FLUIDITY TRANSPARENT | SOLIDIFIED — |
| | TPGDA | SEPARATED INTO TWO LAYERS — | GOOD FLUIDITY TRANSPARENT | SEPARATED INTO TWO LAYERS — |
| | TMPTA | SEPARATED INTO TWO LAYERS — | GOOD FLUIDITY TRANSPARENT | SEPARATED INTO TWO LAYERS — |
| | PETA | SOLIDIFIED — | GOOD FLUIDITY TRANSPARENT | SEPARATED INTO TWO LAYERS — |
| | TMP (EO)TA | SEPARATED INTO TWO LAYERS — | GOOD FLUIDITY TRANSPARENT | SEPARATED INTO TWO LAYERS — |

[Abbreviations in Table 3]
HDDA: 1,6-hexanediol diacrylate
TPGDA: tripropylene glycol diacrylate
TMPTA: trimethylolpropane triacrylate
PETA: pentaerythritol triacrylate
TMP(EO)TA: trimethylolpropane ethylene oxide (EO)-added triacrylate (VISCOAT V#360, product of OSAKA ORGANIC CHEMICAL INDUSTRY LTD.)

As is clear from Tables 2-1 to 2-3 and 3, in each of the active energy ray curable resin compositions in the Examples, the Test Example 2

Examples 8 to 13 and Comparative Examples 4 to 6

Adhesion Test

Two hundred parts by weight of ethyl acetate used as a melting aid was added to 100 parts by weight of each of the block copolymers produced in Reference Examples 1 to 7 and 9, and the mixtures were heated and melted at 75° C. Then 400 parts by weight of tripropylene glycol diacrylate (TPGDA) and 150 parts by weight of trimethylolpropane triacrylate (TMPTA) were added dropwise to the mixtures. After completion of dropwise addition, ethyl acetate was evaporated under reduced pressure, and the resultant mixtures were cooled to room temperature under stirring, thus preparing active energy ray curable resin compositions (Examples 8 to 13 and Comparative Examples 4 and 5). The obtained active energy ray curable resin compositions, except for the composition using the block copolymer in Reference Example 6, exhibited good solution properties even after the compositions were left to stand at 23° C. for 24 hours.

Two hundred parts by weight of tetrahydrofuran used as a melting aid was added to 100 parts by weight of the modified polyolefin resin composition produced in Reference Example 8, and the mixture was heated and melted at 60° C. Then 400 parts by weight of tripropylene glycol diacrylate (TPGDA) and 150 parts by weight of trimethylolpropane triacrylate (TMPTA) were added dropwise to the mixture (Comparative Example 6). After completion of dropwise addition, tetrahydrofuran was evaporated under reduced pressure, and the resultant mixtures were cooled to room temperature under stirring. The obtained active energy ray curable resin composition was separated into two layers after left to stand at 23° C. for 24 hours.

Four Parts by weight of 1-hydroxy cyclohexyl phenyl ketone used as a photo-polymerization initiator was added to and dissolved in 100 parts by weight of each of the active energy ray curable resin compositions obtained above. Then the mixtures were applied to polypropylene base material in a thickness of 5 to 10 μm using a #6 Meyer Bar. The test specimens were irradiated with ultraviolet rays from a distance of 10 cm using an ultraviolet irradiation apparatus having a metal halide lamp as a light source at an energy dose of 150 mJ/cm$^2$, whereby coated plates coated with the active energy ray curable resin compositions were obtained.

Each coated plate was left to stand at 23° C. for 24 hours. Then, according to the cross-cut peeling test method described in JIS K 5400, a test piece with a cross-cut pattern having 100 (10×10) 2-mm squares was produced, and cellophane adhesive tape was applied to the test piece and peeled off at an angle of 90°. The test piece was evaluated according to the number of unpeeled squares out of 100 squares in the cross-cut pattern. In the evaluation, the larger the number of unpeeled squares, the better the adhesion. The results are shown in Tables 4 and 5.

TABLE 4

ADHESHION TEST

| | EXAMPLE 8 | EXAMPLE 9 | EXAMPLE 10 | EXAMPLE 11 | EXAMPLE 12 | EXAMPLE 13 |
|---|---|---|---|---|---|---|
| BLOCK COPOLYMER | REFERENCE EXAMPLE 1 | REFERENCE EXAMPLE 2 | REFERENCE EXAMPLE 3 | REFERENCE EXAMPLE 4 | REFERENCE EXAMPLE 5 | REFERENCE EXAMPLE 9 |
| SOLUTION PROPERTIES AND TRANSPARENCY OF ACTIVE ENERGY RAY CURABLE RESIN COMPOSITION* UPPER ROW: SOLUTION PROPERTIE LOWER ROW: TRANSPARENCY | GOOD FLUIDITY TRANSPARENT | GOOD FLUIDITY TRANSPARENT | GOOD FLUIDITY SLIGHTLY TURBID | GOOD FLUIDITY CLOUDY | GOOD FLUIDITY TRANSPARENT | GOOD FLUIDITY TRANSPARENT |
| CROSS-CUT PEELING TEST (NUMBER OF REMAINING SQUARES) | 95 | 80 | 100 | 55 | 40 | 70 |

TABLE 5

ADHESHION TEST

| | COMPARATIVE EXAMPLE 4 | COMPARATIVE EXAMPLE 5 | COMPARATIVE EXAMPLE 6 |
|---|---|---|---|
| BLOCK COPOLYMER | REFERENCE EXAMPLE 6 | REFERENCE EXAMPLE 7 | REFERENCE EXAMPLE 8 |
| SOLUTION PROPERTIES AND TRANSPARENCY OF ACTIVE ENERGY RAY CURABLE RESIN COMPOSITION* UPPER ROW: SOLUTION PROPERTIE LOWER ROW: TRANSPARENCY | SEPARATED INTO TWO LAYERS — | GOOD FLUIDITY TRANSPARENT | SEPARATED INTO TWO LAYERS — |
| CROSS-CUT PEELING TEST (NUMBER OF REMAINING SQUARES) | TEST IMPOSSIBLE | 0 | TEST IMPOSSIBLE |

[Footnote to Tables 4 and 5]

*: Composition ratio (parts by weight):block copolymer (or modified polyolefin resin composition)/TPGDA/TMPTA=100/400/150

Tables 4 and 5 clearly show the following. The compositions in Comparative Examples 1 and 3 were separated into two layers and therefore not used for the adhesion test. The composition in Comparative Example 2 did not have any adhesion to the polypropylene base material. In contrast, the active energy ray curable resin compositions in the Examples exhibited good adhesion.

As is clearly evident from the above results, the active energy ray curable resin compositions in the Examples are compositions that have both good solution properties and good adhesion to the polyolefin base material after curing.

The invention claimed is:

1. An active energy ray curable resin composition, comprising:
   a block copolymer (C) that comprises a polymer block (A) comprising an olefin-comprising monomer unit and a polymer block (B) comprising at least one selected from the group consisting of a unit derived from (meth)acrylic acid and a unit derived from (meth)acrylic ester,
   wherein the block copolymer (C) has a weight-average molecular weight of 5,000 or more and 100,000 or less; and
   an active energy ray curable compound (D);
   wherein the composition comprises no solvent, and
   wherein an amount of the block copolymer (C) is 0.1 wt % or more and 40 wt % or less.

2. The composition of claim 1, further comprising:
   a photopolymerization initiator (E).

3. A paint, ink, adhesive, sealant, or primer suitable for a base material, or molded product comprising a polyolefin-containing resin, comprising the composition of claim 1.

4. A coating film, formed by curing the composition of claim 1 on a surface of a base material or molded product comprising a polyolefin-comprising resin.

5. A base material or molded product comprising a polyolefin-comprising resin, comprising a coating layer obtained by curing the composition of claim 1.

6. The composition of claim 1, wherein the block copolymer (C) contains no chlorine.

7. The composition of claim 1, consisting of the block copolymer (C) and the energy ray curable compound (D).

8. The composition of claim 1, consisting essentially of the block copolymer (C) and the active energy ray curable compound (D).

9. The composition of claim 1, in the form of a uniform liquid solution.

10. The composition of claim 1, which is in the form of a single phase.

11. A resin cured product obtained by curing the composition of claim 1.

12. The composition of claim 1, wherein the block copolymer (C) consists of the polymer block (A) and the polymer block (B).

* * * * *